United States Patent
DeMan

[11] 3,927,804
[45] Dec. 23, 1975

[54] LIQUID DISPENSER WITH MULTI-CONTAINER RESERVES

[76] Inventor: Heiko T. DeMan, 435 Cola Ballena, Alameda, Calif. 94501

[22] Filed: Mar. 7, 1974

[21] Appl. No.: 449,038

Related U.S. Application Data

[63] Continuation-in-part of Ser. No. 355,665, April 30, 1973, abandoned.

[52] U.S. Cl. .............................. 222/136; 222/145
[51] Int. Cl.² .......................................... B67D 5/52
[58] Field of Search ........ 222/129.1, 129, 131, 132, 222/136, 145, 174, 183, 185, 188, 444, 424.5, 457, 436; 141/356, 106, 364

[56] References Cited
UNITED STATES PATENTS

| | | |
|---|---|---|
| 1,334,523 | 3/1970 | Cornish ............................ 222/129.1 |
| 2,337,292 | 12/1943 | Champion ........................... 141/106 |
| 2,711,268 | 6/1953 | Cannella ............................ 222/145 |
| 2,962,193 | 11/1960 | Totten ............................... 222/145 |
| 3,598,287 | 8/1971 | DeMan ................................ 222/38 |
| 3,647,118 | 3/1972 | Johnson et al. .................... 222/136 |

FOREIGN PATENTS OR APPLICATIONS

| | | |
|---|---|---|
| 1,804,593 | 5/1970 | Germany ............................ 222/145 |

*Primary Examiner*—Robert B. Reeves
*Assistant Examiner*—H. Grant Skaggs
*Attorney, Agent, or Firm*—Flehr, Hohbach, Test, Albritton & Herbert

[57] ABSTRACT

Apparatus for dispensing liquids from a multi-bottle source of flavors having various individual bottles supported in an inverted position for gravity flow to a pump, the bottles being supported at different levels so that the pump will not drain them simultaneously. A neck extension for each bottle maintains the liquid uncontaminated from tax stamp, its adhesive, paper material, or the like on the bottle necks. The pump delivers liquids to a dispensing faucet, and a level indicator is provided to indicate when the lowest liquid level is being approached.

5 Claims, 8 Drawing Figures

LIQUID DISPENSER WITH MULTI-CONTAINER RESERVES

CROSS REFERENCE TO RELATED APPLICATION

This is a Continuation-in-Part of U.S. Ser. No. 355,665, filed Apr. 30, 1973 and now abandoned.

BACKGROUND OF THE INVENTION

This invention pertains generally to liquid-dispensing apparatus and specifically concerns an improved apparatus for dispensing relatively high-priced liquids, such as distilled alcoholic beverages, from a milti-container reserve of each flavor of beverage.

The liquid dispensers of the prior art were generally designed to distribute the beverage from single bottles of different flavors. In a large establishment having a high capacity service bar dispensing alcoholic beverages it was necessary for frequent replenishment of the reserves which could occasion worker time from serving alcoholic beverages and a consequent loss of income to the business establishment. Consequently there was a need for dispensing alcoholic beverages from a large reserve supply which could be replenished during the slack period.

A requirement by the alcoholic beverage regulating authorities of certain governmental jurisdiction is that each bottle of proof alcoholic liquor shall carry a tax or revenue stamp and that the same be located to extend along the neck and over the cap of the bottle so that when the bottlecap is removed, the tax stamp will be broken. Certain of these authorities have also required that while salable liquor remains in a bottle, such as one lodged in a dispensing apparatus, that portions of the tax stamp remaining on the neck of the bottle be visible for inspection by the regulatory authorities. For sanitary and hygienic reasons it is desirable that these tax stamps be held from contact with the beverage so that the beverage contained in the bottle will not become contaminated by the tax stamp, its adhesive, paper material, or the like.

SUMMARY OF THE INVENTION AND OBJECTS

In summary the invention concerns a liquid-dispensing apparatus for a variety of flavors of liquids from a multi-container source of each flavor and includes a structure for supporting a plurality of containers arranged by flavor so that containers of the same flavor are disposed in a group. Pump means are provided, the inlet of which is in communication with at least one of the group of containers and the outlet of which is in communication with a dispensing faucet. The containers are supported so that each container is maintained with respect to an individual liquid receptacle in an open-mouthed, inverted position permitting liquid to flow from the container by gravity. The receptacles in each group are fluidly interconnected and the container supports are arranged so that the individual containers in the group are disposed with their outlets at different elevations permitting all the containers in the group to empty non-simultaneously for individual replacement and affording long, continuous supply to the pump means.

An object of the invention is to provide an improved liquor dispenser which will accommodate more than one bottle of each flavor of liquor for dispensing.

Another object of the invention is to provide an improved liquor dispenser having a substantial reserve of liquor of various flavors so arranged that the bottles in each reserve will empty consecutively and not concurrently.

Another object of the invention is to provide apparatus of the type described which is arranged for use at a service bar having two or more service stations.

Another object of the invention is to provide in an apparatus of the type described a facility for accommodating bottles of the various shapes especially in the neck and shoulder region of the bottles.

Another object of the invention is to provide apparatus of the type described having provisions for positioning the bottles so that the tax stamp or other labels customarily supplied upon the neck of the bottle of liquor be visible for inspection and not contaminate the supply of liquor dispensed from the unit.

Another object of the invention is to provide in a liquor dispenser with reserves positioned at a remote location from the dispensing station, means safeguarding the unattended runout of liquor and complete depletion of the reserves.

Further objects and advantages of the invention will appear from the following description in which the preferred embodiment is set forth in detail in conjunction with the accompanying drawings.

DESCRIPTION OF THE PREFERRED EMBODIMENT

Figure 1:
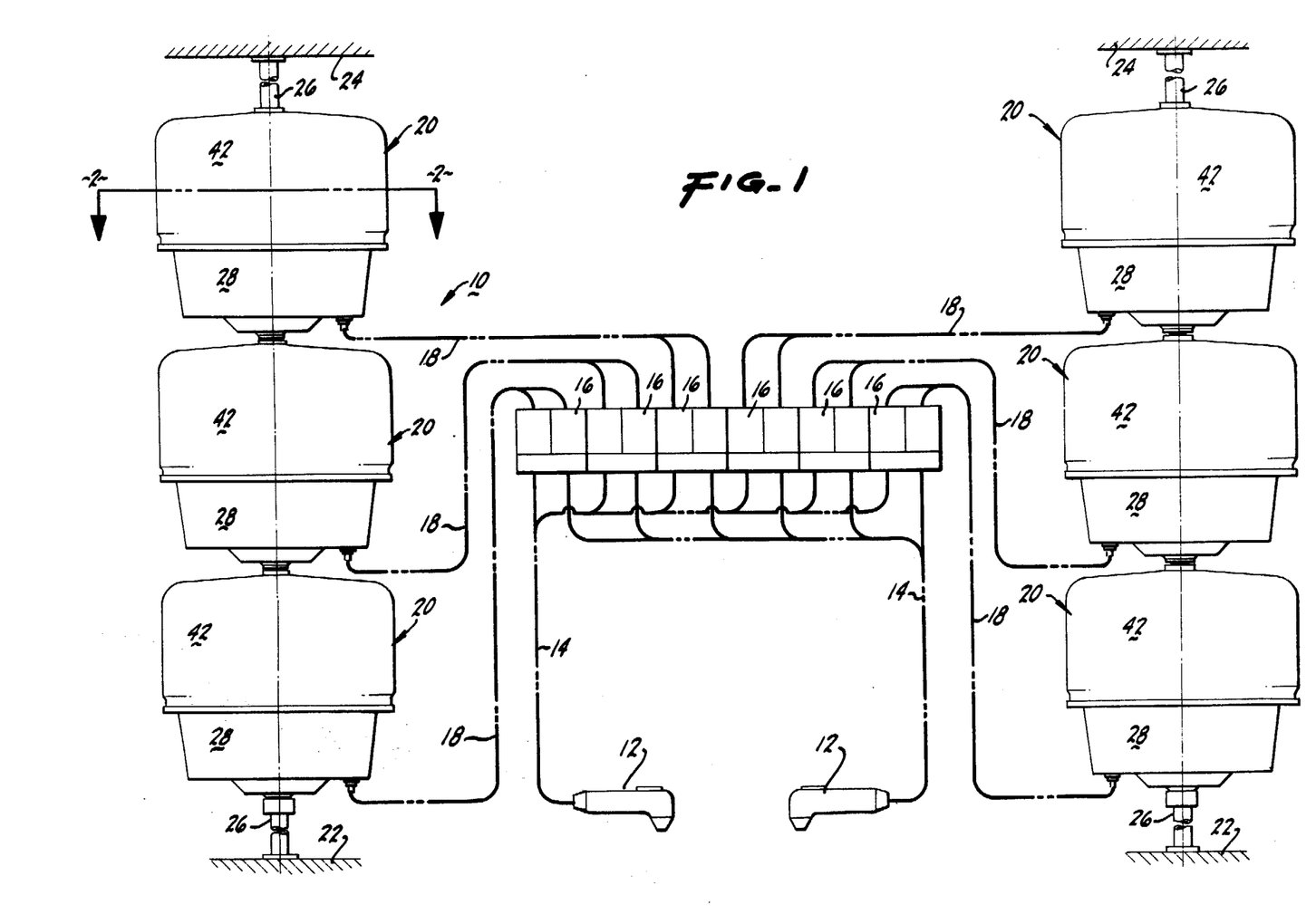
FIG. 1 is an elevation view, partially broken away and partially in schematic form, showing a liquid dispensing system of one preferred form of the present invention.

There is shown in FIG. 1 of the drawings a liquid dispensing apparatus 10 according to one preferred form of the present invention, and as an exemplary embodiment, is expressly adapted for dispensing at two different stations six different flavors of distilled alcoholic beverages from substantial reserves of each of the beverages so that the system may be operated continuously for a substantial period without interruption for replenishment of any one of the reserves. In general, the liquid dispensing apparatus 10, includes dispensing faucets 12 connected by multi-tubed hoses 14 to the pumps 16, the inlets of which are connected by tubing 18 to one of the banks or liquid reserves 20. The banks 20 may be ranged in tiers from floor 22 to ceiling 24 of a storage room or the like and may be maintained in their operative relationship upon the central strut or pole 26.

From the above it will be understood that the liquid dispensing apparatus 10 comprises a plurality of banks 20, for example six, each accommodating a plurality of bottles, for example six one-half gallon bottles, of a single flavor of the common alcoholic beverages such as bourbon, scotch, and rye whiskeys, gin, vodka, and rum. Each one of the banks 20 is connected to two of the pump units 16, and each pump unit is in liquid communication with one of the dispensing faucets 12, as shown in FIG. 1. Check valve means 15 are interposed in the conduits 14 preferably adjacent to the faucets 12 to prevent accidental draining of any bank 20 should either the pumps or faucet malfunction. The check valve structure is of the adjustable pressure differential type which will open only in response to increased line pressure induced by the pump and will close against the liquid head when the pump pressure returns to null. The banks and pump units may be located in an out of the way location such as a storage room in a business establishment such as a hotel and the conduits 14 to the dispensing units 12 may be on the order of 15 to 30 feet long so that the operative apparatus may be located in a remote position from the liquid dispensing stations. The pumps 16 and dispensing faucets 12 and their associated components may be constructed and arranged as disclosed and claimed in my issued U.S. Pat. No. 3,598,287 granted Aug. 10, 1971. However, it is to be understood that other pumps and dispensing faucets are adaptable to the present liquid dispensing apparatus system.

Figure 2:
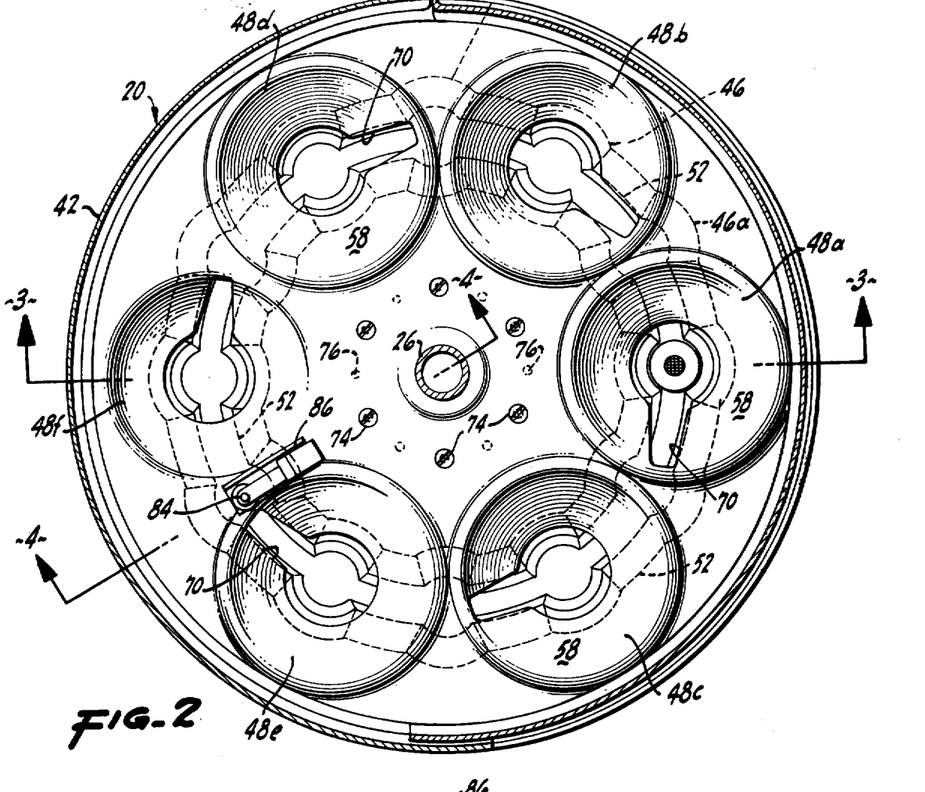
FIG. 2 is a sectional view along the lines 2—2 of FIG. 1.
Figure 3:
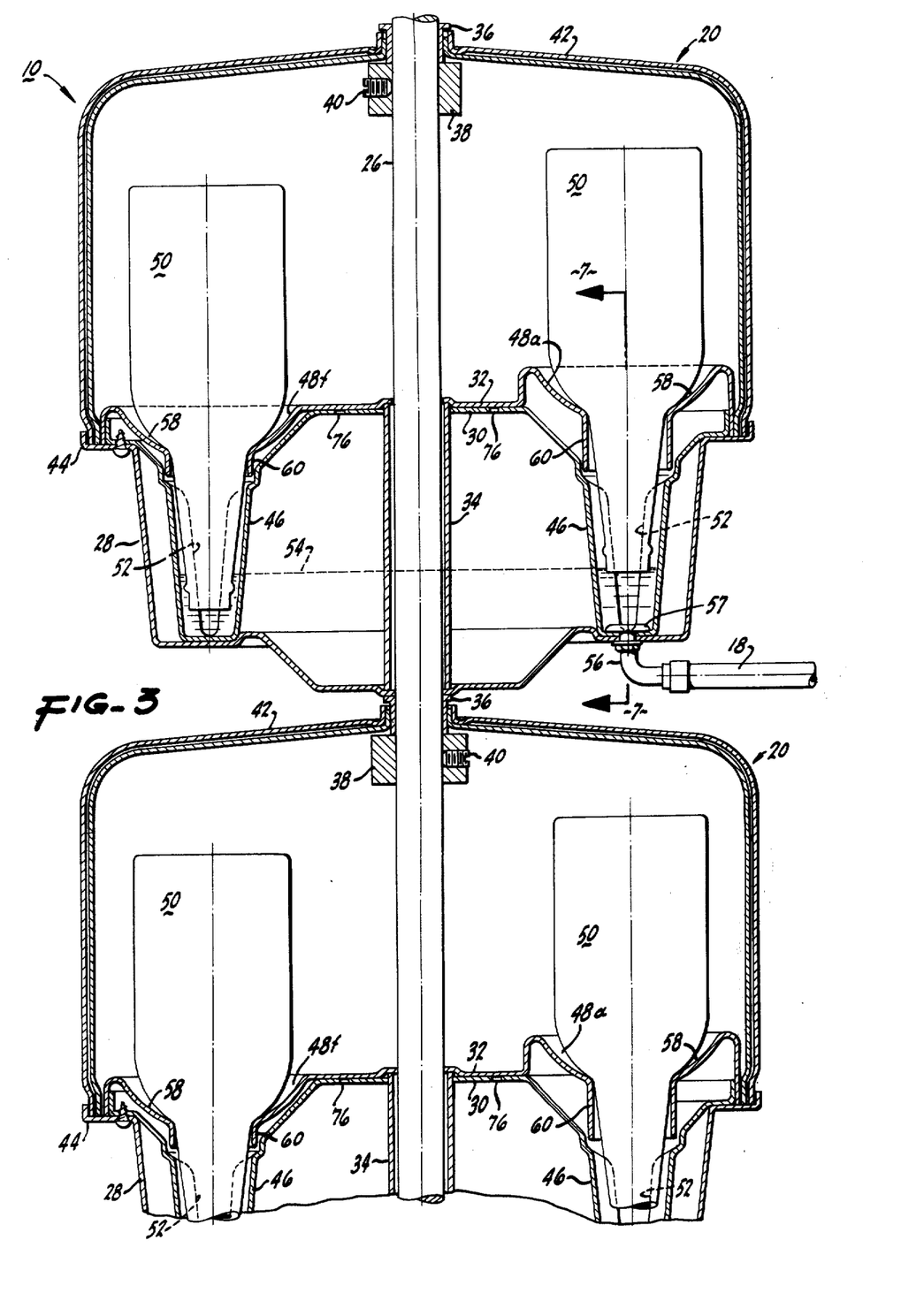
FIG. 3 is a sectional view along the lines 3—3 of FIG. 2.

Each of the banks 20 is of similar construction so that only one need be described in detail. Considering specifically FIGS. 2 and 3, it will be seen that each bank or liquid reserve unit 20 is generally circular in horizontal cross-section and is centered upon and supported vertically upon the strut 26. The bank includes a lower housing member 28 or support pan of general dish-like configuration which receives a base 30 or well-ring over which is arranged a bottle support platform or bottle ring 32. A sleeve 34 through which the strut 26 is received extends between the lower housing member 28 and the bottle support platform 32, as shown in FIG. 3. A bushing 36 engages the lower housing member 38 opposite the lower end of the sleeve 34 and is retained on the strut 26 by a block 38 equipped with a holding set screw 40. The bushing 36 also serves as a central guide for the two-part, telescopically rotatable upper housing members 42 which form a hood when in the closed position, as shown in FIG. 1. The lower edges of the two part hood 42 are supported slidably with respect to an outer flange portion 44 of the lower housing member 28.

The upper and lower housing member 28, 42, base 30, and bottle support platform 32 may each be formed from synthetic sheet materials via the vacuum forming technique which is well understood in the art.

Figure 5:
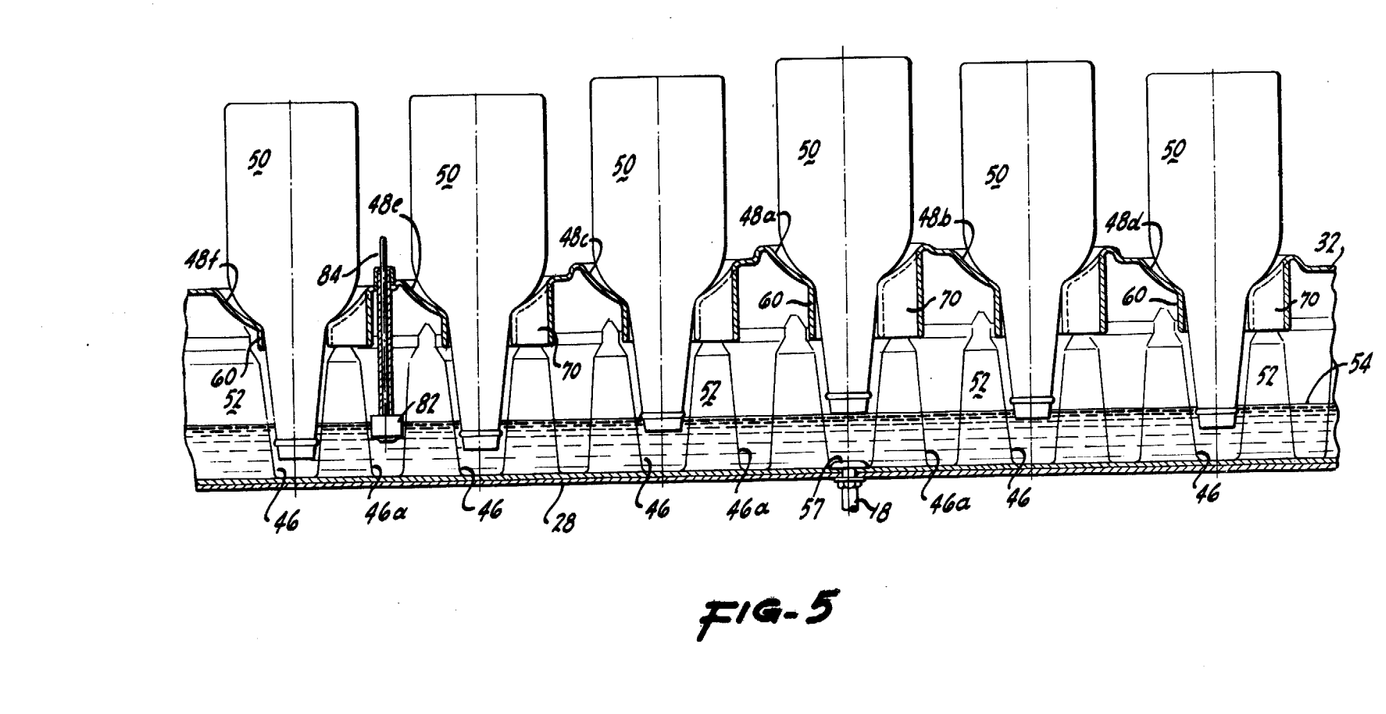
FIG. 5 is a developed view of the arrangement of bottles illustrated in FIG. 2.

Each bottle support platform or ring 32 in the exemplary embodiment is formed to accommodate six bottles of one-half gallon capacity in an inverted open-mouth condition so that their contents will be received in six of the twelve receptacles or wells 46 formed in the base member or well ring 30, these six receptacles being arranged in register with the bottle support portions 48 of the platform 32. Referring now specifically to FIGS. 2 and 5, the bottle support portions are formed to support the six bottles on the platform each at a different elevation so that the six bottles will empty sequentially one after the other and not concurrently. More specifically, bottle support 48A is formed to support a bottle 50 at the highest position and bottle support 48F is formed to support a bottle 50 in the lowermost position. The order of elevation between the bottle support 48A for the highest bottle and bottle support 48F for the lowest bottle is in alphabetical order as shown in FIGS. 2 and 5 with the bottle setting in support 48B being slightly lower than the one in 48A; 48C being slightly lower than 48B; 48D being slightly lower than 48C; 48E being slightly lower than 48D and slightly higher than 48F. An advantageous circular arrangement as shown in FIG. 2, has the highest and lowest of the supports opposite one another with the intermediate supports distributed on either side. A linear form of arrangement of the bottle supports e.g., in a straight line as suggested by FIG. 5 and as contrasted to the circular form, may be employed.

The receptacles or wells 46, as shown in broken lines in FIG. 2 are interconnected by a channel formation 52 so that there is liquid interconnection between each of the receptacles establishing a common liquid level 54 in the bank 20. Alternatively, the receptacles may be conceptualized collectively as a circular channel or ring having twelve, spaced radial enlargements or wells for receipt of the bottle neck portions.

The open mouths of the bottle 50 extend below the liquid level 54 varying distances depending upon the arrangement of the associated bottle support 48A-F. The incremental differences in elevation between bottles in a series may be on the order of 3/16 to ¼ of an inch. The bottle support platform 32 forms a cover over the liquid within the base member 30, the bottles being in position, and substantially reduces evaporation. The air space in the receptacles is not pressurized and consequently the atmospheric pressure 14.7 lbs. per square inch acts upon the liquid surface 54 to support the column of liquid contained within the bottles 50 until the level 54 falls just below the mouth of the bottles. The reservoir of liquid contained within the base member or well ring 30 is connected to the pump inlet tubing 18 through means of a connector such as an elbow 56 equipped with associated liquid-tight sealing members. A filter element 56 such as a screen is arranged over the outlet from the reservoir preventing entrainment of foreign materials into the pump unit. Thus as either or both of the two pumps 16 are connected to the bank 20 draw down the liquid level 54 first the bottle supported in 40A will be caused to be emptied, next the bottle in 48D, etc. Being that the bank accommodates on the order of three gallons of liquid, an opportunity would be had before all is exhausted to inspect all the contents of six bottles and to replace the empty ones while contents yet remain in other bottles.

Figure 6:
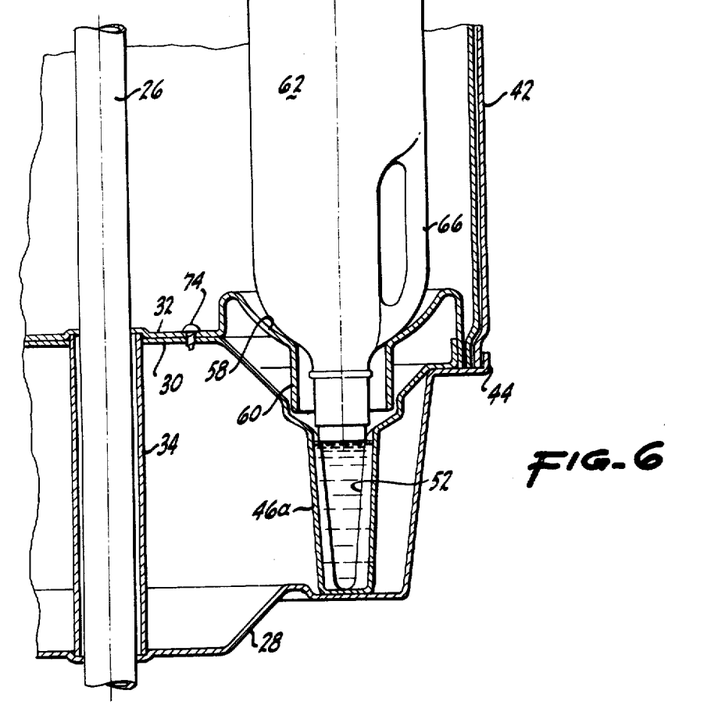
FIG. 6 is a view similar to FIG. 3 but with the top deck or bottle support platform rotated 30 degrees.
Figure 7:
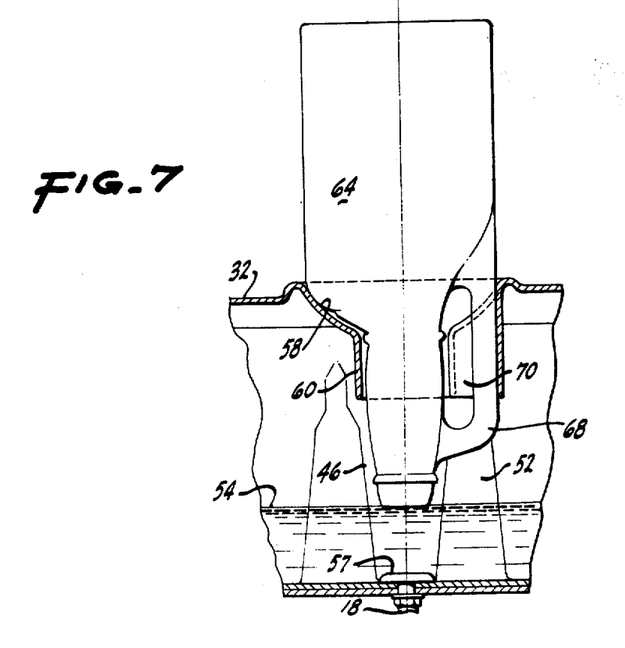
FIG. 7 is a fragmentary sectional view along the lines 7—7 of FIG. 3.

It will be seen from FIGS. 3, 6, and 7 that the bottle support portion 48 of the platform 32 supports the associated bottle 50 along the shoulder and neck portion of the bottle. More specifically, each bottle support 48 has a concaved dish-like surface which merges into a downwardly extending collar 60 which projects into the receptacle 46 to register therebelow. Means are provided in the present invention for accommodating bottles of markedly varying or different configurations in the neck and shoulder area, including handle equipped bottles, lending a high degree of utility to the subject apparatus. Bottles of different shapes, typical of those which may be accommodated in the present apparatus are illustrated in FIGS. 3, 6, and 7.

More specifically, it will be observed as to the bottles 62 of FIG. 6 and 64 of FIG. 7, the handle portions 66 and 68, respectively, are formed on the side of each. The difference in the length of the necks between the bottles 62 and 64 will also be apparent and it has been observed that in the one-half gallon bottle size a narrow neck is frequently short, as shown in FIG. 6, while the fatter neck may, in certain cases, be long as illustrated in FIG. 7.

Referring now specifically to FIG. 2 it will be seen that a receiving slot 70 is formed in the bottle support to receive handles such as illustrated in FIG. 7. This permits the handle position to extend into the channel 52 between receptacles when the slot 70 and channels are in register.

Certain bottles are formed with relatively short or narrow necks, such as illustrated in FIG. 6, whereby the side of the neck portion may be spaced a small distance from the collar 60 of the bottle support. Serving to accommodate bottles of such configuration, another group of six receptacles 46A is provided in the base number 30 and dimensioned so that the upper portions of the receptacle 46A are narrow so as to be engaged by the lip of the bottle to prevent rotation towards overturning the bottle within the bottle support. To bring the six receptacles 46A into register with the six bottle supports 48, the fasteners 74, which units the base 30 to the bottle support platform 32, are dismounted and the parts 30, 32 are rotated 30 degrees. The fastener 74 degrees are then placed in the alternate holes provided in the base member 30. Thus a wide variety of bottles may be accommodated in the unit 10.

Figure 4:
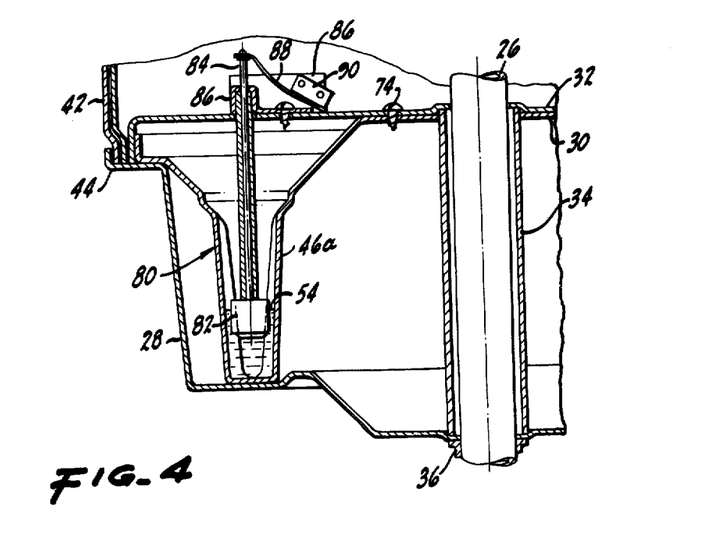
FIG. 4 is a fragmentary sectional view along the lines 4—4 of FIG. 2.

Means for detecting a pre-determined liquid level are included in the apparatus 10, as shown in FIGS. 2 and 4, to avoid sucking air into the system. The liquid level sensor 80 is electrically coupled to the actuation circuits of the pump 16 and is operative to preclude pump operation when there is insufficient liquid in the reservoirs of the receptacles thus avoids sucking air into the system. More specifically, the liquid level sensor is an electromechanical unit comprising a float 82 having an upstanding vertical rod 84 guided by a bracket 86 mounted on the support platform 32. An arm 88 is mounted to the end of the float rod 84 and extends for operative engagement to the actuator of a micro-switch 90 arranged on the bracket 86. The float 82 may be arranged in either receptacles 46 or 46A depending upon the position of the support platform with respect to the base as required by the shape of the bottles to be accommodated in the bank unit 20. When the liquid level 54 falls to a pre-selected low level the arm 88 disengages the contact of the micro-switch opening the circuit and signaling the predetermined low liquid level and placing the pump units in an inoperative condition for dispensing.

OPERATION

To place the unit 10 in operative condition for dispensing liquids through the two dispensing faucets 12, it is first necessary that the banks or reserves 20 be charged. Commonly, the unit 10 will be operated in a service bar within a hotel and is useful for serving large groups of people such as commonly are found attending a convention or the like. The apparatus 10 can be located in a locked room, remote from the liquor dispensing area. This separates the liquor dispensing funciton from the storage function and reduces unauthorized use of the products, unexplained shortages, and promotes better inventory control over alcoholic beverages.

It is highly desirable that the liquid dispenser 10 be charged with a variety of alcoholic beverages such as bourbon, scotch, and rye whiskeys, gin, vodka, and rum, with one flavor to each of the banks 20.

Each bank 20 is filled to capacity by placing six one-half gallon bottles 50, with the caps removed, in an overturned, mouth-down condition within the six bottle supports 48A–F. The liquid level 54 quickly rises in the interconnected reservoirs 46, 46A to reach a level where the mouth of the bottle support 48A is at or just below the liquid level 54. It will be appreciated that all of the bottles within a bank 20 are of the same flavor, are desirably of the same brand, and have the same bottle general configuration in the neck and shoulder area of the bottle.

Power is supplied to the pumps 16 and the circuit of the micro-switch for the liquid level sensor 80 is made operative from an electric power source. The dispensing faucets being operatively coupled to the pumps 16 are each then ready to supply in discrete volumes any one of the six flavors.

After a large number of cycles of the dispensing faucets 12 pertaining to a flavor in one of the six banks, the liquid level 54 in a bank 20 will be drawn down lower than the mouth of the bottle 50 in support 48A which would then stand in an empty position. Similarily, if the liquid level is drawn down further the bottle in support 48B has its mouth exposed and so forth until the bottle in support 48F only is supplying the liquid to the dispensing faucets 12 with the remaining five bottles standing in an empty condition. This would take a substantial period of time for five one-half gallon bottles of an alcoholic beverage to be dispensed, there would be a slack time for a worker to inspect the apparatus 10 and replace the empty bottles with full ones without the necessity of drawing down the liquid from all six of the one-half gallon bottles and causing the liquid level sensor to indicate to the operator of the dispensing faucet 12 that one of the banks was completely empty. However, the liquid level sensor 80 may be so arranged that when the liquid level falls below a predetermined level which may be just below the level of the mouth of the bottle in support 48E, a signal will be given to the operator such as by cutting off pump action regarding the particular flavor having the low level.

When it is desired to use bottles having handles those handles may be received within the handle receiving slots 70 and the bottles are then supported nestably as shown in FIG. 7, the slots 70 and channel position 52 being in register. Other types of bottles may be safely held in the bottle receiving receptacles 46A and to this end the bottle support platform 32 is rotated 30 degrees to bring into register the second series of six receptacles 46A to accommodate those bottles of differing configurations.

The upper housing or hood 42 serves as a dust cover reducing entrainment of foreign bodies into the beverages.

SECOND PREFERRED EMBODIMENT

Figure 8:
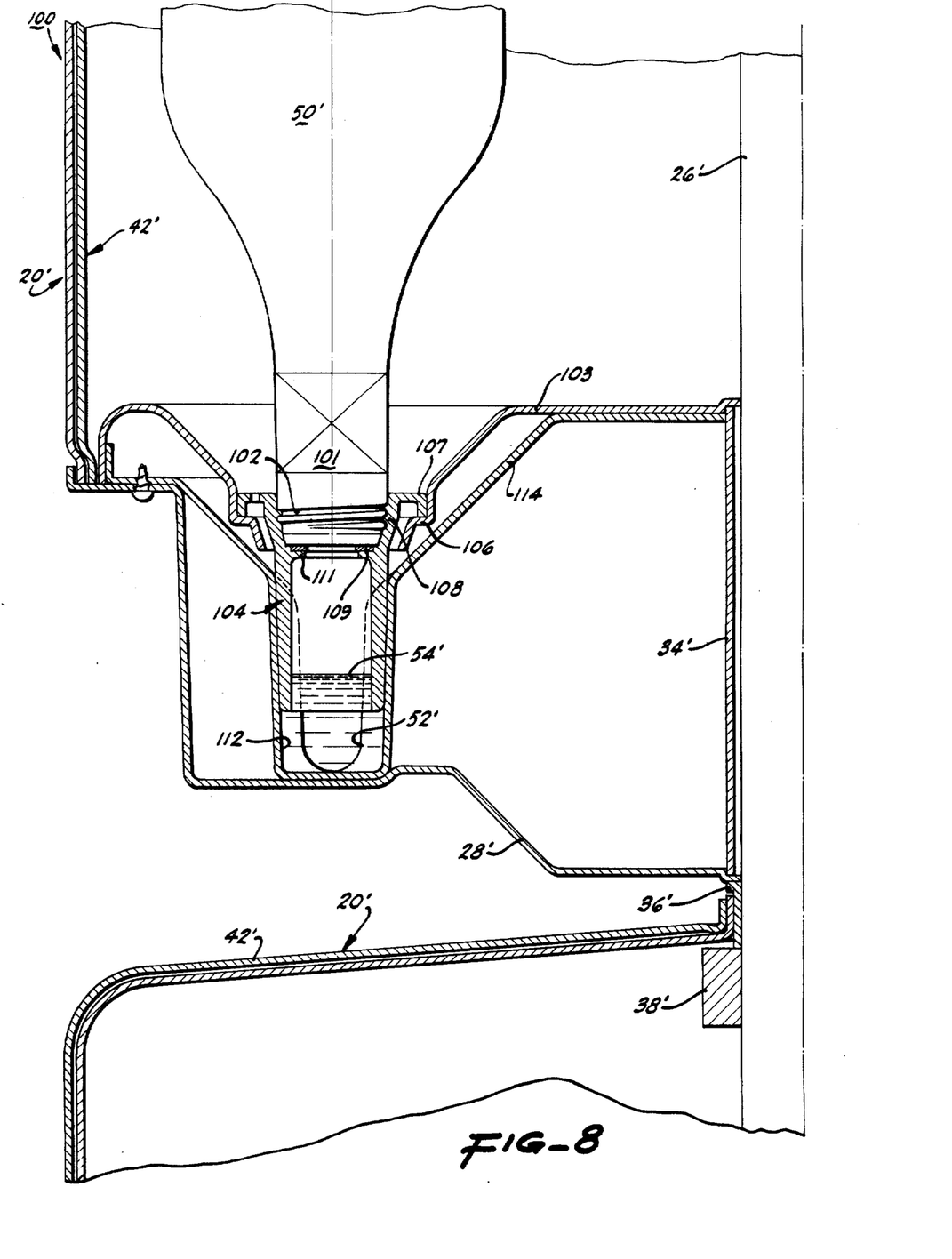
FIG. 8 is a view like FIG. 3, but illustrating a second preferred forming the invention.

A second preferred embodiment 100 of the present invention is shown in FIG. 8. The embodiment 100 includes structures previously described such as the pumps 16, valve means 15 and faucet 12 but not shown and also parts which are shown and these are marked with the same numerals as used above but carrying a superscript prime. Examples of structures previously described and incorporated in this second preferred embodiment are the strut 26', lower housing member or supporting pan 28', the hood or upper housing member 42' and bottle 50'.

It will be observed that a tax stamp 101 is secured to the bottle at the neck portion thereof and adjacent to the threads 102. In certain governmental jurisdictions, it is required that the tax stamp 101 be afixed to the bottle and neck to extend over the cap (not shown) so that when the cap is removed the tax stamp will be broken thus preventing legal reuse of the bottle 50' for liquor. Another legal requirement is that bottles, such as those frequently used in a dispensing liquor unit as disclosed herein, be maintained in a condition so that inspectors from the liquor regulating agencies are able to visually inspect all of the bottles in the dispensing unit 100 to see that these bottles all carry the required tax stamp 101. From the standpoint of hygiene and sanitation it is desirable that the tax stamp 101 be maintained in a position so that it does not become immersed in the body of liquor to be dispensed but is maintained above the liquid level 54' in the particular bank 20'.

To afford these functional advantages, means are provided on the bottle support platform or bottle ring 103 for coacting with bottle neck extensions 104, connected to the necks of the bottles 50', for supporting the bottle and neck extension units, each at different vertical elevation. The bottle support platform at the bottle locations include annular seats 106 which engage the radially extending shoulder portions 107 of the bottle neck extensions 104 for supporting the bottles 50' vertically.

The bottle neck extension 104 is of hollow tubular construction and is equipped at one end with the threads 108 which cooperatively engage the threads 102 of the bottle 50'. A compressible washer 109 is seated between the lip of the bottle 50' and an inwardly projecting annular seat 111 of the extension 104 so that a fluid tight joint is formed between the bottle 50' and neck extension 104.

It is recognized that liquor bottles come in different shapes and necks of varying diameters as well as threads 102 of varying pitch and conformation. Thus the threaded portions 108 of the extensions 104 are formed in various thread pitches and configurations for accommodating the threaded neck ends of the different shaped containers. It is preferable that the overall end-to-end dimension of extension 104 should be uniform irrespective of the thread configurations at the upper end.

So that the bottles 50' may be supported laterally with respect to the unit, the bottle neck extensions 104 are sized laterally so as to fit snugly within the well or receptacle 112 of the well ring 114, against the sidewalls thereof as shown in FIG. 8. Six or more wells 112 may be formed in the well ring 113 and the wells are interconnected at openings in the sidewalls by a channel 52', so that a uniform liquid level 54' may be maintained in the channel and receptacles throughout each bank 20'.

It will be understood that the bottles support portions or seats 106 of the bottle or ring platform 103 are disposed at different elevations so that the end of the neck extensions 104, all disposed above the bottom of the receptacles, will each be at a different elevation in their respective receptacles. Thus, the bottles will empty serially or consecutively in each unit 20' so that they may be replaced before six or more of the bottles are depleted.

In the second preferred embodiment 100 the receptacles may be arranged in a line for mounting against the wall of a room as illustrated in FIG. 5 of the drawings as contrasted to the circular configuration as illustrated in FIG. 2.

It will appear from the above that there has been described an improved liquid dispensing apparatus for a variety of different kinds of liquids from a multi-container source of each. The subject apparatus is flexibly adapted to accommodate a variety of different bottles and to supply a plurality of dispensing faucets, such as at a service bar or the like, so that the operators may perform their tasks without interruption required by frequent replenishment of the liquor reserves.

I claim:

1. A liquid dispensing apparatus for a variety of kinds of liquids from a multi-container source of each kind, comprising means for supporting a plurality of containers arranged by the distinctive character of their contents so that containers of the same content are disposed in a group, pump means, means permitting fluid interconnection between at least one group of said containers and said pump means, dispensing faucet means including means for selectively activating said pump means, tube means fluidly interconnecting said dispensing faucet means and said pump means, said container support means for each group including a liquid receptacle for each container in the group such liquid container being maintained with respect to said support means in an open-mouthed, inverted, position, permitting gravity flow of liquid from each container into a receptacle, said receptacles in each group being fluidly interconnected so as to permit a common liquid level in the receptacles for the group, said container support means including means serving to support individual containers in the group so that their outlets are disposed above the common liquid level in their respective receptacles and including tubular means extending from the container outlet to below the common liquid level, the containers being arranged on said support means so that the bodies of liquid in the respective containers are at different elevations permitting the containers in the group to empty sequentially affording long continuous supply to said pump means.

2. The apparatus of claim 1 wherein said tubular means serve as dismountable extensions to the necks of the liquid containers, each such tubular extension means including provisions for forming a fluid tight connection with the open mouth of the associated container so as to permit the fluid to flow by gravity from the container through the extension means and into one of said receptacles.

3. The apparatus of claim 2 wherein said tubular extension means include radially extending shoulder portions, and cooperative seating means on said container support means adjacent to said receptacles serving to support said extension means and the associated liquid containers at said shoulder portions so that the extensions may project downwardly into said receptacles, said extensions terminating above the bottom of said receptacle.

4. The apparatus of claim 3 wherein said cooperative seating means are at least equal in number to the number of liquid containers in such group thereof, and each seating means being arranged vertically spaced from the other seating means so that they are disposed in different horizontal planes, presenting the associated liquid containers connected to said extension means at different elevations for emptying in serial sequence.

5. The apparatus of claim 4 wherein said receptacles include sidewall portions engaging the sides of said tubular extension means, and coacting therewith for laterally supporting the liquid container connected to said tubular extension means.

* * * * *